(12) United States Patent
Takahashi et al.

(10) Patent No.: US 7,380,997 B2
(45) Date of Patent: Jun. 3, 2008

(54) MONITOR CAMERA

(75) Inventors: Masami Takahashi, Kanagawa (JP);
Toshio Nagashima, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/578,821

(22) PCT Filed: Jan. 7, 2005

(86) PCT No.: PCT/JP2005/000138

§ 371 (c)(1),
(2), (4) Date: May 9, 2006

(87) PCT Pub. No.: WO2005/071946

PCT Pub. Date: Aug. 4, 2005

(65) Prior Publication Data

US 2007/0104478 A1    May 10, 2007

(30) Foreign Application Priority Data

Jan. 9, 2004    (JP) .............................. 2004-003692

(51) Int. Cl.
*G03B 17/00*    (2006.01)
*H04N 7/18*    (2006.01)

(52) U.S. Cl. ...................... 396/427; 396/424; 348/143; 348/373

(58) Field of Classification Search ................ 396/427, 396/419, 424, 428; 348/143, 180, 207.99, 348/207.1, 207.11, 373, 374; 250/363.02, 250/559.08, 559.46; 358/906
See application file for complete search history.

(56) References Cited

U.S. PATENT DOCUMENTS 6,678,001 B1 *   1/2004   Elberbaum .................. 348/373

FOREIGN PATENT DOCUMENTS

| JP | 2002-156702 |   | 5/2002 |
|----|-------------|---|--------|
| JP | 2003040034 A | * | 2/2003 |
| JP | 2003043567 A | * | 2/2003 |

* cited by examiner

*Primary Examiner*—Rochelle-Ann Blackman
(74) *Attorney, Agent, or Firm*—Pearne & Gordon LLP

(57) ABSTRACT

A monitor camera (1) has a front glass (13) and a glass hold-down plate for holding the front glass (13). The glass hold-down plate has an outer surface in a region continues to the front glass (13), and the outer surface is flush with or stepped back from an outer surface of the front glass (13). Further, the glass hold-down plate has a hold-down portion vertical to the direction of the thickness of the front glass (13), the hold-down portion presses the held-down portion stepped back from the outer surface of the front glass (13). The above structure prevents the field of vision of the monitor camera (1) from being hindered by natural substances including snow lying on the front glass and enhances waterproof property of the monitor camera.

1 Claim, 8 Drawing Sheets

PRIOR ART

MONITOR CAMERA

TECHNICAL FIELD

The present invention relates to a monitor camera for shooting an object to be monitored.

BACKGROUND ART

A monitor camera is installed at a monitoring place for shooting an object to be monitored. The place to install the monitor camera may be an outdoor. FIG. 8 is a perspective view of an example of the monitor camera in the related art. A monitor camera 30 includes a camera case 31 and a front glass 32. The front glass 32 is formed of a transparent glass plate and, in an example shown in the drawing, has a square shape. The camera case 31 has a substantially square tubular shape in cross section, and includes an imaging device including a lens, an imaging element, and a processing circuit stored therein. The monitor camera 30 picks up an image of an object of shooting, which is an object to be monitored through the front glass 32 and shoots the object of shooting.

The camera case 31 holds a periphery of the front glass 32. An end of the camera case 31 is bent inwardly to form a front wall and the front glass 32 is held from the side of an outer surface thereof at an opening of the front wall.

FIG. 9 is an enlarged cross-sectional view showing a holding position at which the camera case 31 holds the front glass 32. The front glass 32 is pressed from a rear side thereof by a glass holding plate 33 against an inner surface of the front wall of the camera case 31 and fixed thereto. The glass holding plate 33 is fixed to the camera case 31 with screws. An O-ring 34 is provided at a portion where the front glass 32 and the camera case 31 come into abutment so that the waterproof property of the camera case 31 is secured.

As described above, in the monitor camera 30, the camera case 31 presses the front glass 32 from the side of the outer surface to hold the front glass 32. Accordingly, as shown in FIG. 8 and FIG. 9, the outer surface of the front glass 32 is stepped back inwardly in comparison with an outer surface of the camera case 31, and hence a step is formed. When the monitor camera 30 is installed in outdoor, natural substances such as snow or dust may be accumulated on the step. When snow is accumulated on the step, a field of view through the front glass 32 of the monitor camera 30 is hindered, and hence part of the image of the object to be monitored cannot be obtained.

In view of such points, for example, a camera case having a configuration as shown below is disclosed in JP-A-2002-156702 (pp. 2-3, FIG. 3). FIG. 10 shows a front view of the camera case. A front glass 42 is fitted to a front panel 43 of a camera case 41. A defroster glass 44 for removing water drops or fogging up is provided in front of the front glass 42. The defroster glass 44 is pressed against the front glass 42 from the side by a glass presser 45. Then, an annular packing groove 46 is provided at a part where the front panel 43 supports the front glass 42, and a packing 47 is fitted to the packing groove 46. The defroster glass 44 comes into tight contact with the packing 47 by being pressed by the glass presser 45. Accordingly, the waterproof property in the camera case 41 is secured.

As shown in FIG. 10, the defroster glass 44 has a tapered shape having an inclined portion 441 inclined so as to increase the diameter toward a surface of the front glass 42. The glass presser 45 has a tapered shape provided with an inclined portion 451 corresponding to the inclination of the inclined portion 441 of the defroster glass 44. The height of a surface of the glass presser 45 is set to be the same as or the lower than the height of the defroster glass 44 in a state in which the inclined portion 441 of the defroster glass 44 is held down by the inclined portion 451 of the glass presser 45. In this arrangement, the step caused by the glass presser 45 being higher than the defroster glass 44 is eliminated from the camera case 41, so that the field of view of the monitor camera is prevented from being hindered by snow accumulated on an outer surface of the defroster glass 44.

However, with the camera case 41, the inclined portion 441 of the defroster glass 44 is pressed by the inclined portion 451 of the glass presser 45, so that the defroster glass 44 is fixed. Therefore, when a tolerance of the defroster glass 44 is large and the dimensional accuracy is low, there is a case in which the defroster glass 44 does not come into tight contact with the packing 47 sufficiently in a state in which the glass presser 45 is fixed to the camera case 41. In this case, the waterproof property of the camera case 41 is lowered.

DISCLOSURE OF INVENTION

Problem to be Solved by the Invention

In order to solve the problems in the related art, it is an object of the present invention to provide a monitor camera in which natural substances such as snow are prevented from being accumulated in front of the monitor camera, reliability of the sealing is high, and a high waterproof property is achieved.

Means for Solving the Problems

A monitor camera according to the present invention includes a shooting window member; a hold-down portion having an outer surface which is flush with or stepped back from an outer surface of the shooting window member and engaging with the shooting window member with a surface perpendicular to the direction of the thickness of the shooting window member; and a holding portion engaging with the shooting window member and the hold-down portion.

The monitor camera of the present invention includes a shooting window member; and a holding portion having an outer surface which is flush with or stepped back from an outer surface of the shooting window member and holding the shooting window member, wherein the shooting window member is bonded to the holding portion.

The monitor camera according to the present invention includes: a shooting window member; and a holding portion having an outer surface which is flush with or stepped back from an outer surface of the shooting window member and holding the shooting window member, and the shooting window member is integrally formed with the holding portion.

As described below, the present invention includes other aspects. Therefore, disclosure of the present invention is intended to provide part of the aspects of the present invention, and is not intended to limit the scope of the invention described and claimed here.

Figure 1:
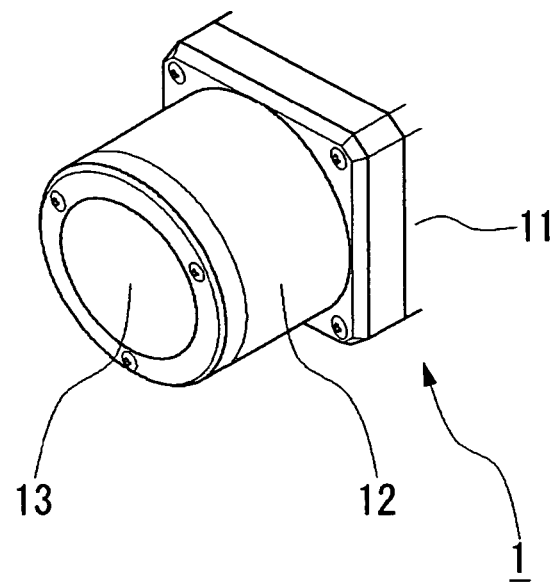
FIG. 1 is a perspective view of a monitor camera according to a first embodiment of the present invention.

REFERENCE NUMERALS 1 monitor camera
11 camera case
12 lens storage cover
13 front glass
14 O-ring
17 glass hold-down plate
20 collar

BEST MODE FOR CARRYING OUT THE INVENTION

Detailed description of the present invention will be given below. However, the detailed description the attached drawings are not intended to limit the invention. Instead, the scope of the invention is defined by attached claims.

According to an aspect, a monitor camera includes: a shooting window member; a hold-down portion having an outer surface which is flush with or stepped back from an outer surface of the shooting window member and engaging with the shooting window member with a surface perpendicular to the direction of the thickness of the shooting window member; and a holding portion engaging with the shooting window member and the hold-down portion.

In this arrangement, since the outer surface of the hold-down portion is located at the same position as, or backwardly of, the outer surface of the shooting window member, natural substances such as snow can be prevented from being accumulated on the outer surface of the shooting window member even when the monitor camera is installed in the outdoor. Since the hold-down portion engages with the shooting window member with a surface perpendicular to the direction of the thickness of the shooting window member, sealing is ensured.

According to this monitor camera, the holding portion includes a holding member and an annular member mounted to the holding member and engaging with the shooting window member. In this arrangement, the shooting window member is mounted to the holding portion easily using the annular member.

In this monitor camera, a shooting window assembly is configured in a state in which the annular member and the shooting window member are engaged. In this arrangement, since the annular member is simply mounted to the holding portion body in the state of being engaged with the shooting window member when the monitor camera is assembled, and hence assembly is simple.

In this monitor camera, the shooting window member is configured by a first plate-shaped member and a second plate-shaped member having a size smaller than the first plate-shaped member being bonded together, and the shooting window member engages the hold-down portion at a portion of the first plate-shaped member protruded from the second plate-shaped member. In this arrangement, the shooting window member is held by the holding portion by engagement between the protruded portion of the shooting window member and the annular member.

In this monitor camera, the shooting window member is held by the holding portion by caulking. In this arrangement, the configuration for holding the shooting window member can be realized easily. In particular, by providing a shoulder portion on the side of the outer surface of the shooting window member and configuring a structure for holding the shoulder portion down from the side of the outer surface, manufacture can be facilitating.

A monitor camera according to another aspect includes; a shooting window member; and a holding portion having an outer surface which is flush with or stepped back from an outer surface of the shooting window member and holding the shooting window member; and the shooting window member is bonded to the holding portion.

In this arrangement, since the outer surface of the holding portion is located at the same position as, or backwardly of, the outer surface of the shooting window member, even when the monitor camera is installed in outdoor, natural substances such as snow can be prevented from being accumulated on the outer surface of the shooting window member. Since the shooting window member is bonded and held by the holding portion, sealing is ensured.

A monitor camera according to another aspect includes; a shooting window member; and a holding portion having an outer surface which is flush with or stepped back from an outer surface of the shooting window member and holding the shooting window member, and the shooting window member is integrally formed with the holding portion.

In this arrangement, since the outer surface of the holding portion is located at the same position as, or backwardly of, the outer surface of the shooting window member, even when the monitor camera is installed in the outdoor, natural substances such as snow is prevented from being accumulated on the outer surface of the shooting window member. Since the shooting window member is formed integrally with the holding portion, sealing is ensured.

Referring now to the drawings, a monitor camera according to an embodiment of the present invention will be described.

FIG. 1 is a perspective view of the monitor camera according to a first embodiment of the present invention. As shown in FIG. 1, a monitor camera 1 includes a camera case 11, a lens storage cover 12, and a front glass 13. The camera case 11 has a tubular shape in a substantially square shape in cross section. The lens storage cover 12 has a cylindrical shape, and is mounted to a front side of the camera case 11, which constitutes part of the camera case 11. The front glass 13 has a disk shape and the diameter thereof is smaller than the diameter of the cross-section of the lens storage cover 12. The front glass 13 is held by an end portion of the lens storage cover 12 on the side of the object of shooting.

An imaging element, a processing circuit, and so on are stored in the camera case 11, and a lens group including a plurality of lenses is stored in the lens storage cover 12. The object to be monitored is shot through the front glass 13. In this manner, the front glass 13 is a window through which the object to be monitored is shot, and corresponds to the shooting window member in the present invention. In this embodiment, the lens storage cover 12 constitutes the holding portion for holding the shooting window member. The monitor camera 1 is provided, for example, at a high position in the outdoor. The picture of the object to be monitored shot by the monitor camera 1 is transmitted to a monitor at a remote site where a watcher is.

Figure 2:
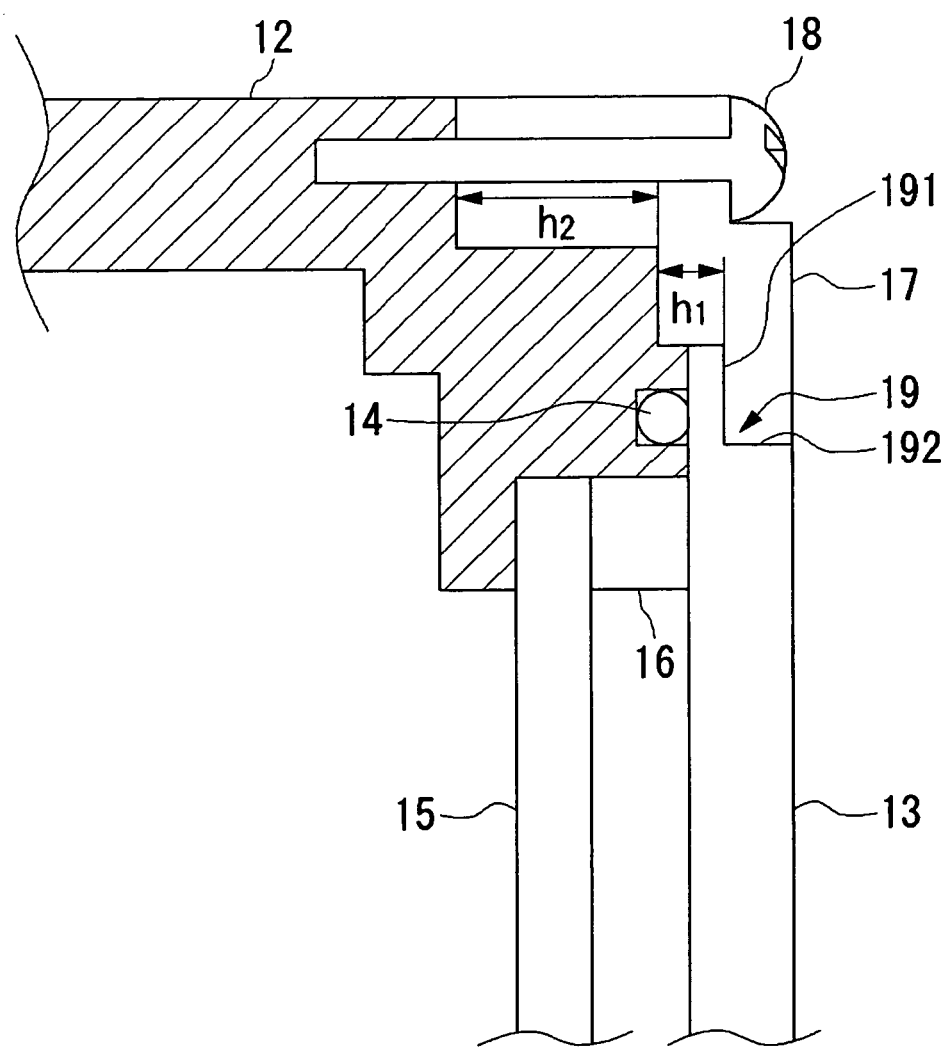
FIG. 2 is a cross-sectional view of a principal portion of a front end portion of a lens storage cover according to the first embodiment of the present invention.
Figure 3:
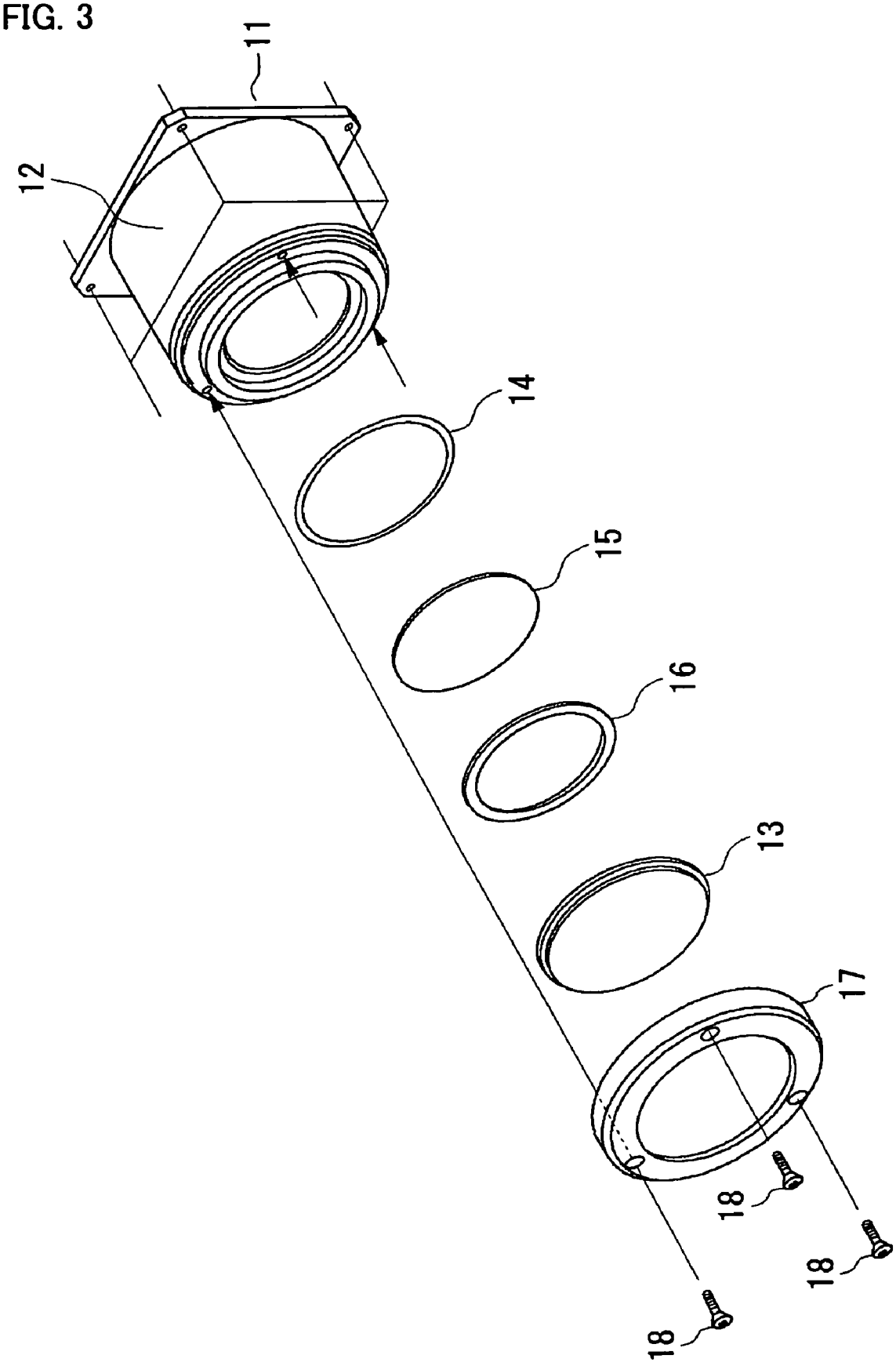
FIG. 3 is an exploded assembly drawing of a front end portion of the lens storage cover according to the first embodiment of the present invention.

FIG. 2 is a cross-sectional view of a principal portion of a front end portion of the lens storage cover 12. FIG. 3 is an exploded assembly drawing of the lens storage cover 12. As shown in FIG. 2 and FIG. 3, an annular sealing packing 14, a disk-shaped rear glass 15, an annular spacer 16, the disk-shaped front glass 13, and an annular glass hold-down plate 17 are mounted to an end portion of the lens storage cover 12. The glass hold-down plate 17 is secured to the lens storage cover 12 by screws at three points, so that the respective members are fixed to the lens storage cover 12.

The end of the lens storage cover 12 is provided with a flange portion for supporting an edge portion of the rear glass 15 from the rear. The rear glass 15 is supported by the flange portion of the lens storage cover 12 at the rear edge portion thereof. The annular spacer 16 is arranged on a front surface of the edge portion of the rear glass 15. The diameter of the outer periphery of the spacer 16 is the same as the diameter of the rear glass 15. The annular spacer 16 and an annular surface of the end portion of the lens storage cover 12 is at the same height. The annular surface of the end portion of the lens storage cover 12 is formed with an annular groove. The sealing packing 14 which is an O-ring is fitted to the groove. The front glass 13 is arranged in front of the spacer 16 and the lens storage cover 12.

The front glass 13 includes a shoulder portion 19 on a peripheral edge thereof formed by cutting on a front side thereof as shown in FIG. 3. The shoulder portion 19 includes a horizontal surface 191 that is perpendicular to the direction of the thickness of the front glass 13 (the lateral direction in FIG. 3) and a wall surface 192 in parallel with the direction of the thickness of the front glass. From above the front glass 13, the annular glass hold-down plate 17 is covered thereon.

The glass hold-down plate 17 includes a projection that engages the shoulder portion 19 of the front glass 13 on the inner peripheral edge thereof. The width of the projection is equivalent with the height of a shoulder portion of the front glass 13. Accordingly, a front surface of the front glass 13 and an outer surface of the glass hold-down plate 17 following thereto are flush with each other in a state in which the projection of the glass hold-down plate 17 and the shoulder portion of the front glass 13 are engaged with each other. The projection of the glass hold-down plate 17 corresponds to the hold-down portion of the present invention, and the horizontal surface 191 of the shoulder portion 19 corresponds to the held-down portion of the present invention.

The glass hold-down plate 17 has holes for securing screws at three positions and is secured to the lens storage cover 12 with the screws through these holes. At this time, as shown in FIG. 2, recesses are provided at securing positions of the glass hold-down plate 17 so that screws 18 do not project outward with respect to the outer surface of the glass hold-down plate 17 and the front surface of the front glass 13.

The glass hold-down plate 17, being fixed to the lens storage cover 12, presses the front glass 13 with the projection toward the lens storage cover 12 (rearward). A rear edge portion of the front glass 13 comes into tight contact with the O-ring 14 and resiliently deforms the O-ring 14, and comes into abutment with the spacer 16 and the lens storage cover 12. The glass hold-down plate 17 of this embodiment serves to hold the front glass 13, and functions as the holding portion of the present invention. The rear glass 15 is fixedly interposed between the flange portion of the lens storage cover 12 and the spacer 16, and the rear glass 15 and the front glass 13 constitute a double-glass structure for preventing these glasses from fogged up.

Subsequently, a method of assembling the monitor camera 1 in this embodiment, more particular, a method of assembling a front end portion of the camera case 11 will be described. When the lens storage cover 12 in a state in which the lens is stored therein is provided, the rear glass 15, the spacer 16, the O-ring 14 and the front glass 13 are fitted to the lens storage cover 12 in sequence, and the glass hold-down plate 17 is fixed to the lens storage cover 12 over these members with the screws 18.

Subsequently, an operation of the monitor camera 1 in this embodiment will be described. As described above, the monitor camera 1 is installed at a high position in the outdoor. In the outdoor, it may snow, or dust or foreign particles may float in the air. In such a case, the snow, the dust or the like may fall on the front glass 13 of the monitor camera 1. However, since there is no step between the front glass 13 and the glass hold-down plate 17 in the area where the front glass 13 is held, the snow or the dust are not accumulated in front of the front glass 13. Therefore, the poor field of view in front of the front glass 13 due to the snow or the dust may be prevented.

As described above, according to the monitor camera 1 in the first embodiment of the present invention, the front glass 13 and the glass hold-down plate 17 are configured to engage with respect to each other, and hence the outer surface of the front glass 13 and the outer surface of the glass hold-down plate 17 following thereto are flush with each other, the step on which snow or the like may be accumulated so as to cover the outer surface of the front glass 13 is not formed, and hence the poor field of view caused by snow or the like accumulated in front of the front glass 13 may be prevented.

According to the monitor camera 1 in the first embodiment described above, a shoulder portion of the glass hold-down plate 17 and the shoulder portion of the front glass 13 are engaged to hold the front glass 13. The glass hold-down plate 17 acts on a surface extending perpendicularly to the direction of pressing, that is, on the horizontal surface 191 of the shoulder portion 19 of the front glass 13 to hold down the front glass 13. Therefore, by designing the glass hold-down plate 17 with the tolerance in the direction of the thickness when forming the shoulder portion 19 of the front glass 13 taken into consideration, and setting a height h1 of a surface that comes into contact with a side surface of the front glass 13 and a height h2 of a portion that comes into contact with the lens storage cover 12 when being secured with screws rather small, the front glass 13 comes into tight contact with the O-ring 14 reliably in a state in which the glass hold-down plate 17 is secured with the screws and resiliently deforms the O-ring 14. Accordingly, the front glass 13 is reliably sealed and hence the waterproof property in the lens storage cover 12 is improved.

The monitor camera according to another embodiments of the present invention will be described below. In any embodiments described below, the general configuration of the monitor camera 1 is the same as the first embodiment. In the embodiment shown below, a structure in which the front glass 13 is held by the lens storage cover 12 is different.

Figure 4:
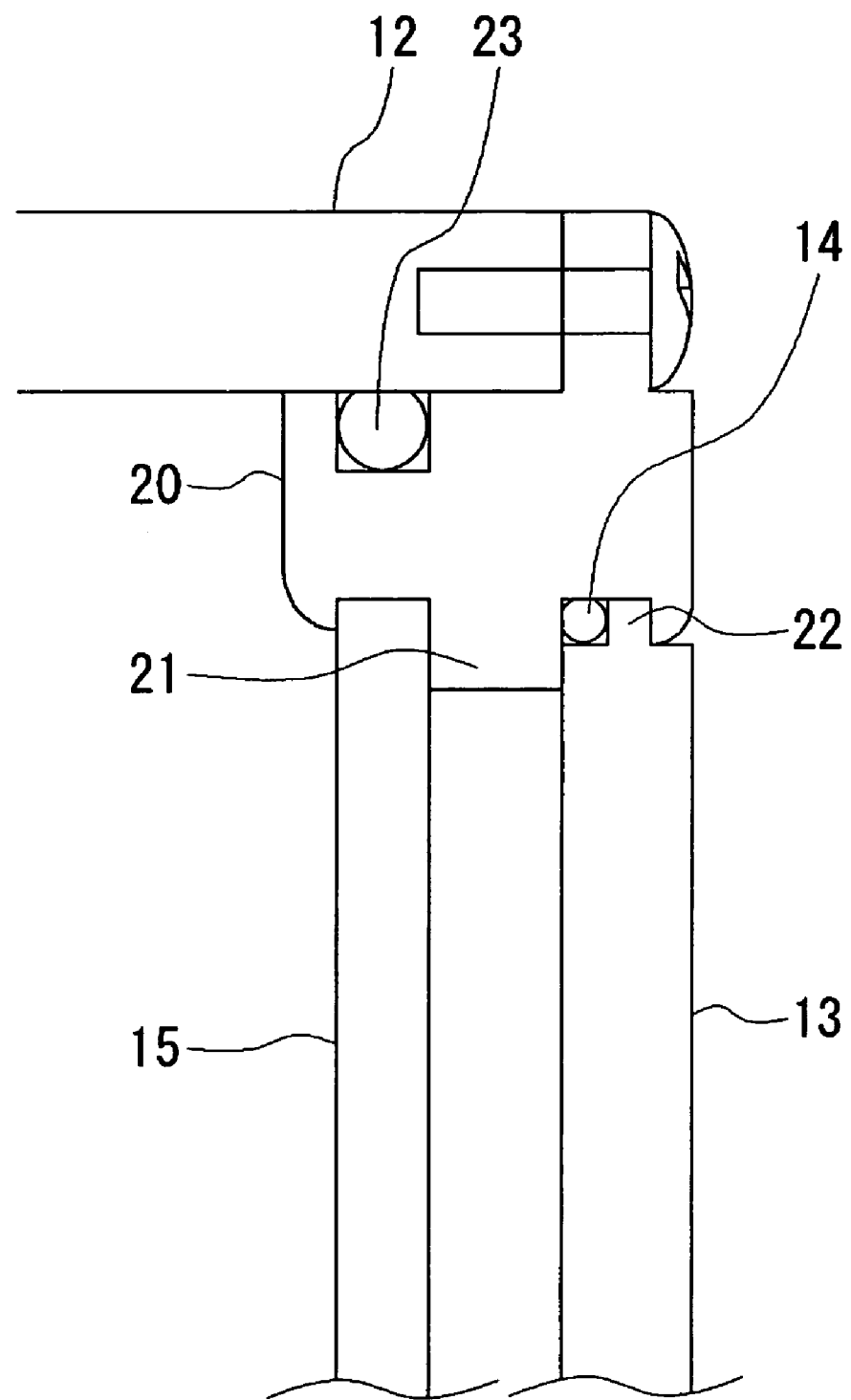
FIG. 4 is a cross-sectional view of a principal portion of the lens storage cover according to a second embodiment of the present invention.

FIG. 4 is a cross-sectional view of a principal portion of the monitor camera according to a second embodiment in the present invention. The monitor camera 1 in the second embodiment is provided with a collar 20 to be fixed to the lens storage cover 12. Then the rear glass 15 and the front glass 13 are fixed to the collar 20. In this embodiment, the holding portion of the present invention is configured by the lens storage cover 12 and the collar 20, and the shooting window member is held.

The collar 20 has a projection on an inner peripheral edge, and a flange portion 21 is configured by the projection. The flange portion 21 functions as a spacer between the rear glass 15 and the front glass 13. A front surface of the rear glass 15 is abutment with the flange portion 21 of the collar 20. The rear glass 15 is fixed to the color 20 by caulking the collar 20 from the back side. The front glass comes into abutment at the back side thereof with the flange portion 21. The front glass 13 is fixed to the collar 20 by caulking the collar 20 from a front surface side. The caulked portion of the collar 20 corresponds to the hold-down portion of the present invention. The shoulder portion on the side of an outer side defined by a projection of the front glass 13 corresponds to the held-down portion to be held down by the caulked portion of the collar 20.

An edge portion on the periphery of the front glass 13 is cut both on an outer surface and a back surface so as to reduce in diameter in comparison with a center portion as shown in FIG. 4. Accordingly, shoulder portions are formed on the outer side and the back side, and these shoulder portions define an annular flange portion 22 formed on the side surface. The O-ring 14 is arranged between the shoulder portion on the back side of the front glass 13 and the flange portion 21 on the collar 20. The collar 20 is caulked on the shoulder portion on the outer side of the front glass 13. The collar 20 has a height (thickness) so that the outer surface of the front glass 13 and an outer surface of the collar 20 come into flush with each other along the front-to-rear direction.

On an outer peripheral edge of the collar 20 holes for being secured to the lens storage cover 12 with screws are provided. The collar 20 is fixed from an outer side to the lens storage cover 12 by screws 18 at the holes. At this time, the screws 18 do not project outward with respect to the outer surface of the collar 20 and the outer surface of the front glass 13. A groove is formed circumferentially on an outer peripheral side surface of the collar 20 and an O-ring 23 is fitted into the groove. The O-ring 23 comes into tight contact with an inner surface of the lens storage cover 12 when the collar 20 is mounted to the lens storage cover 12. The interior of the lens storage cover 12 is hermetically sealed by the O-ring 23 between the lens storage cover 12 and the collar 20 and the O-ring 14 between the front glass 13 and the collar 20, whereby a waterproof property is secured.

Subsequently, a method of assembling the monitor camera 1 according to this embodiment will be described. The O-ring 14 is fitted to the collar 20 first, then the rear lens 15 and the front glass 13 are arranged so as to interpose the flange 21 which serves as a spacer therebetween, and the collar 20 is caulked from the opposite side of the projection. In this state, the front glass assembly is completed. Then, the O-ring 22 is fitted to the groove provided on the outer peripheral side surface of the collar 20, and the collar 20 is secured to the lens storage cover 12 with screws, whereby the front glass assembly is fixed to the lens storage cover 12.

In this embodiment, the step is not formed between the front glass 13 and the collar 20 as in the first embodiment, and hence snow or dust is prevented from being accumulated in front of the front glass 13. Therefore, even when the monitor camera 1 is installed in the outdoor, the poor field of view in the monitor camera 1 due to the snow or the dust may be prevented.

According to the monitor camera 1 of this embodiment, the caulked portion of the collar 20 acts on the shoulder portion on the outer side formed by the flange portion 22 of the front glass 13, and the flange portion 21 of the collar 20 acts on a back surface of the front glass 13. The O-ring 14 comes into press contact with the shoulder portion on a back side defined by the flange portion 22 of the front glass 13. In this arrangement, the front glass 13 is held by the collar 20. That is, the caulked portion of the collar 20 and the flange portion 21 act on the surface perpendicular to the direction of the thickness of the front glass 13 to clamp the front glass 13, and the front glass 13 resiliently deforms the O-ring 14 reliably in tight contact with the O-ring 14. Accordingly, the front glass 13 is reliably sealed and hence the waterproof property in the lens storage cover 12 is improved.

In this embodiment, an assembly independent from the lens storage cover 12 is configured in a state in which the rear glass 15 and the front glass 13 are fixed to the collar 20. The work to be done for the lens storage cover 12 is just to secure the assembly with the screws. In addition, the screwing can be performed from the side of an outer surface of the collar 20. Therefore, manufacturing is facilitated.

In this embodiment, as shown in FIG. 4, the collar 20 is caulked to the shoulder portion of the front glass 13 from the front side. Therefore, at portions other than the caulked portions, grooves are formed between the glass and the collar therearound. For example, if there are three caulked portions, the grooves are formed at portions other than these three portions. Even though these grooves are formed, they do not cause snow or dust to be accumulated on the outer surface of the front glass 13. In this manner, a configuration in which the outer surface of the front glass 13 and the outer surface of the holding portion are not continued and are apart from each other to some extent is also included in the scope of the present invention.

Figure 5:
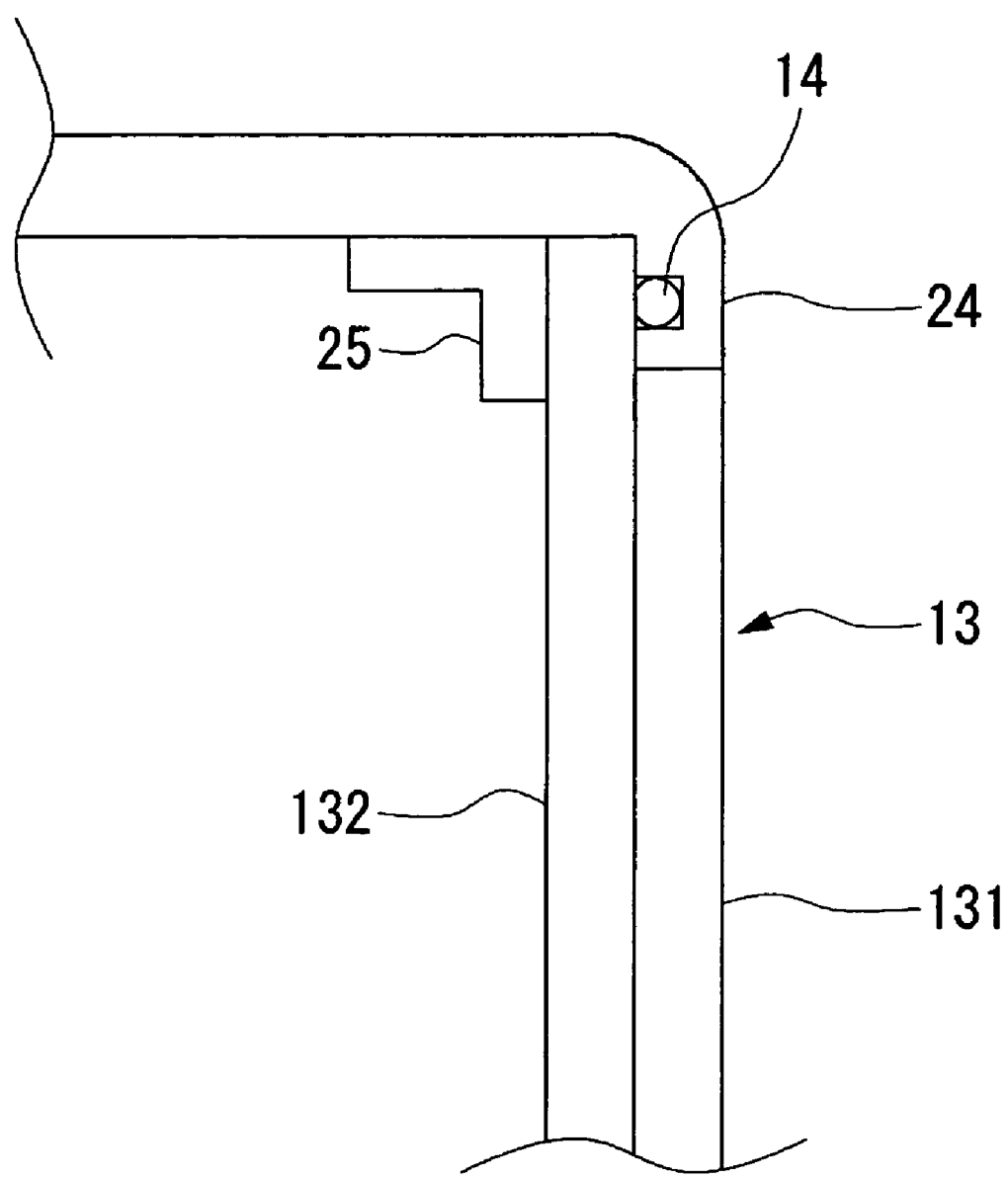
FIG. 5 is a cross-sectional view of a principal portion of the lens storage cover according to a third embodiment of the present invention.

FIG. 5 is a cross-sectional view of a principal portion of the monitor camera according to a third embodiment of the present invention. In this embodiment, two glass plates 131 and 132 having diameters different from each other are brought into contact with each other, whereby the front glass 13 is configured. The front glass 13 is arranged so that the small-diameter glass plate 131 is positioned on an outer side. By bonding the two glass plates having different diameters with respect to each other, a peripheral edge of the large-diameter glass plate 132 is protruded from the small-diameter glass plate 131. The shape of this protruded portion has the same shape as a shoulder portion defined by cutting the edge of a single glass plate on one side.

A front side end of the lens storage cover 12 is bent inwardly to form a front wall 24. The thickness of the front wall 24 is the same as the glass plate 131 on the outer side that constitutes the front glass 13. A groove is formed circumferentially on a back surface of the front wall 24 and an O-ring 14 is fitted into the groove.

The front glass 13 is pressed against an inner surface of the front wall 24 of the lens storage cover 12 by the hold-down plate 25 in the flange shape from a back surface of the large-diameter glass plate 132 on the back side thereby being held by the lens storage cover 12. At this time, an outer surface of the large-diameter glass plate 132 on the back side of the front glass 13 comes into tight contact with the O-ring 14 and resiliently deforms the O-ring 14. Accordingly, the interior of the lens storage cover 12 is hermetically sealed and hence the waterproof property is secured. The front wall 24 of the lens storage cover 12 corresponds to the hold-down portion of the present invention. The shoulder portion on the front glass 13, that is, the portion of the large-diameter glass plate 132 protruded from the small-diameter glass plate 131 corresponds to the held-down portion to be held down by the front wall 24.

In this embodiment, the shoulder portion is formed around the front glass 13 by configuring the front glass 13 with two glass plates 131 and 132 having diameters different from each other. The front wall 24 of the lens storage cover 12 engages with the shoulder portion and no step is defined between the outer surface of the lens storage cover 12 and the outer surface of the front glass 13. Accordingly, even though the monitor camera 1 is installed in the outdoor, natural substances such as snow or dust are prevented from being accumulated in front of the front glass 13 and hindering the field of view.

According to the monitor camera 1 in this embodiment, the front glass 13 is held by pressing a portion of the glass plate 132 on a back side protruded from the glass plate 131 on a front side against an inner surface of the front wall 24 by the hold-down plate 25. Therefore, the outer surface of the glass plate 132 comes into tight contact reliably with the O-ring 14 and resiliently deforms the O-ring 14 irrespective of the tolerance of the thickness of the glass plate 132 that constitutes the glass plate 13. Accordingly, the front glass 13 is reliably sealed and the waterproof property in the lens storage cover 12 is improved.

The glass plates having diameters different from each other are bonded together in order to define the shoulder portion on the front glass 13 for eliminating the step between the outer surface of the lens storage cover 12 and the outer surface of the front glass 13. Accordingly, the process of cutting the front glass 13 is not necessary and hence manufacturing is facilitated.

Figure 6:
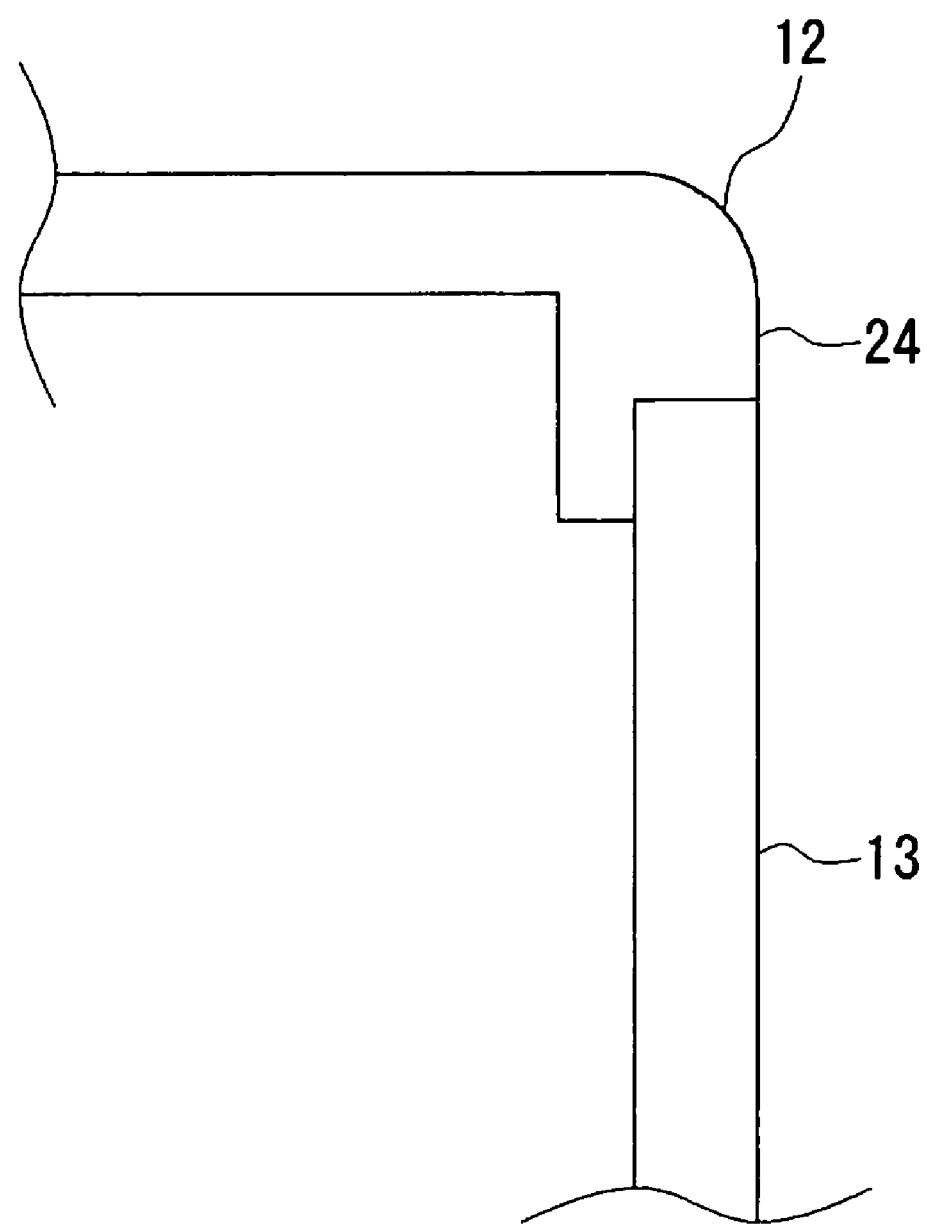
FIG. 6 is a cross-sectional view of a principal portion of the lens storage cover according to a fourth embodiment of the present invention.

FIG. 6 is a cross-sectional view of a principal portion of the monitor camera according to a fourth embodiment of the present invention. In this embodiment, the front end portion of the lens storage cover 12 is bent inwardly to form the flange-shaped front wall 24, and the front wall 24 is formed with an opening for the shooting window. A front outer side of the front wall 24 of the lens storage cover 12 is formed with a shoulder portion having a height which is the same as the thickness of the front glass 13. The diameter of the shoulder portion corresponds to the diameter of the front glass 13, and the front glass 13 is fitted to the shoulder portion. Then, the front glass 13 and the lens storage cover 12 are bonded to each other with adhesive agent between an edge portion of the front glass 13 and a portion of the lens storage cover 12 that comes into abutment thereto.

In this embodiment, since the shoulder portion having the height which is the same as the thickness of the front glass 13 is formed on the front wall 24 of the lens storage cover 12, the outer surface of the front glass 13 and the outer surface of the lens storage cover 12 continuing thereto are flush with each other. Accordingly, even though the monitor camera 1 is installed in the outdoor, natural substances such as snow is prevented from being accumulated in front of the front glass 13 and hindering the field of view.

In this embodiment, since the front glass 13 is held by bonding the front glass 13 to the shoulder portion formed on the front wall 24 of the lens storage cover 12, the lens storage cover 12 and the front glass 13 come into contact with each other and hence the waterproof property in the lens storage cover 12 is improved. In other words, even when there is a tolerance in the direction of the thickness of the front glass 13 to some extent, the tolerance appears only as the difference in height between the front outer surface of the front wall 14 of the lens storage cover 12 and the outer surface of the front glass 13. Therefore, the shoulder portion of the front wall 24 and the front glass 13 come into tight contact with each other irrespective of tolerance. Accordingly, the lens storage cover 12 comes into tight contact with each other. Accordingly, the lens storage cover 12 is hermetically sealed, whereby the waterproof property of the lens storage cover 12 is improved.

In this embodiment, the lens storage cover 12 and the front glass 13 are bonded. It is not necessary to form the shoulder portion on the periphery of the front glass 13, and hence the configuration is simple and cost is low. In particular, manufacturing is facilitated because machining for forming the shoulder portion on the periphery of the front glass 13 is not required.

Figure 7:
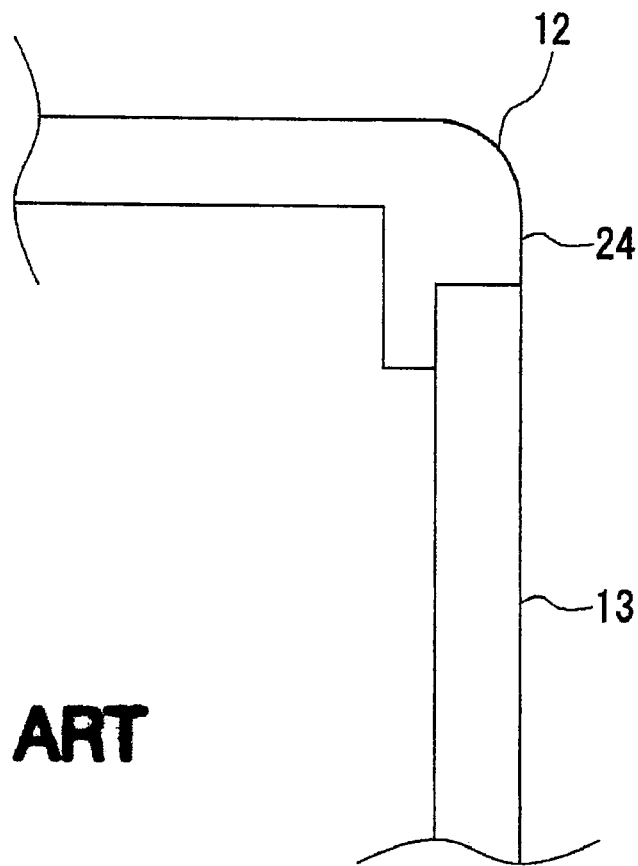
FIG. 7 is a cross-sectional view of a principal portion of the lens storage cover according to a fifth embodiment of the present invention.
Figure 8:
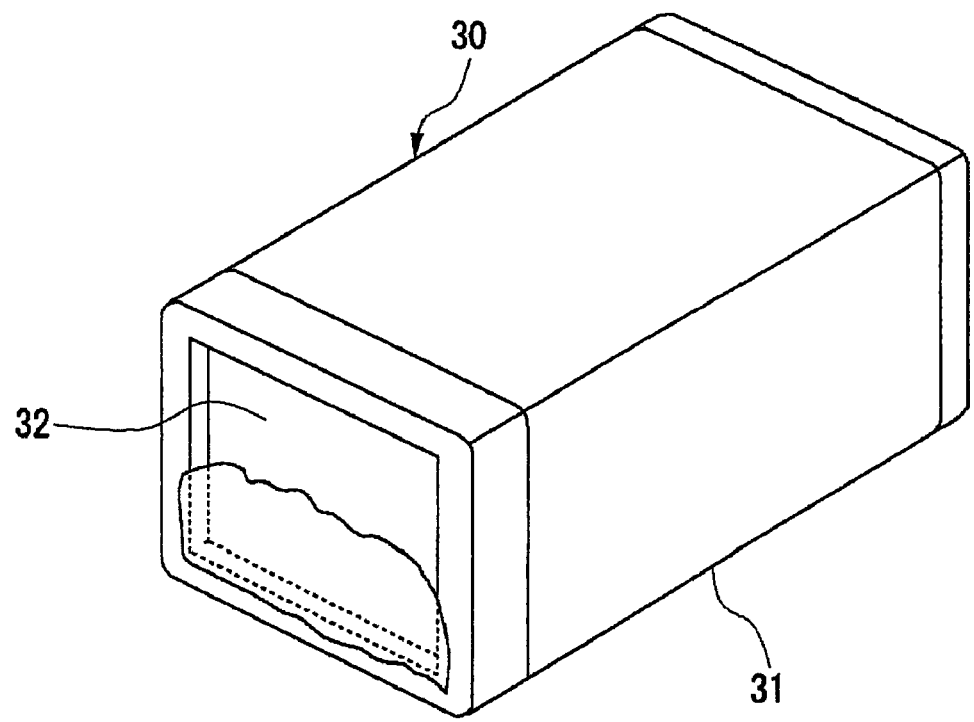
FIG. 8 is a perspective view of a monitor camera in related art.
Figure 9:
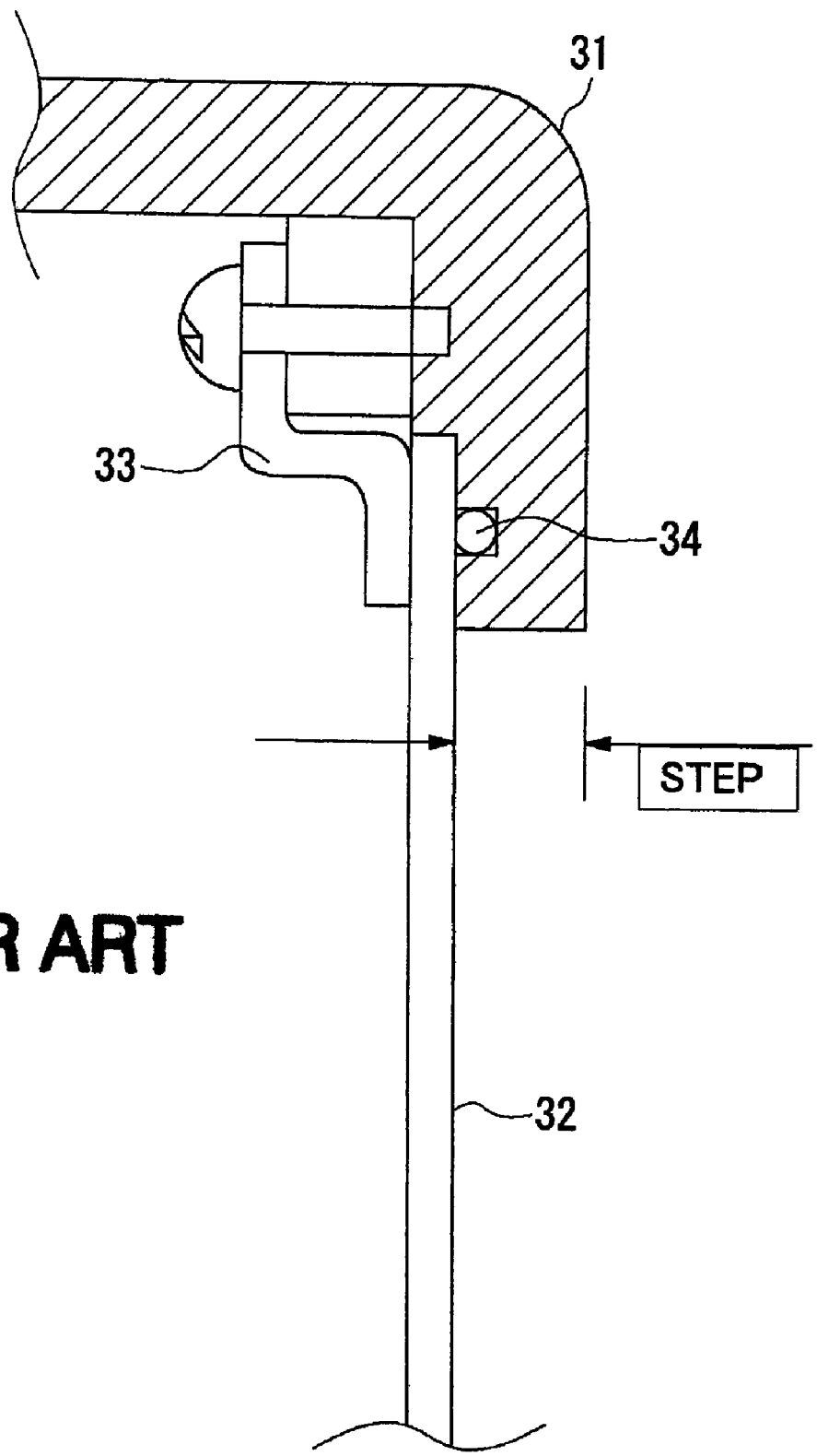
FIG. 9 is an enlarged cross-sectional view of the monitor camera in the related art.
Figure 10:
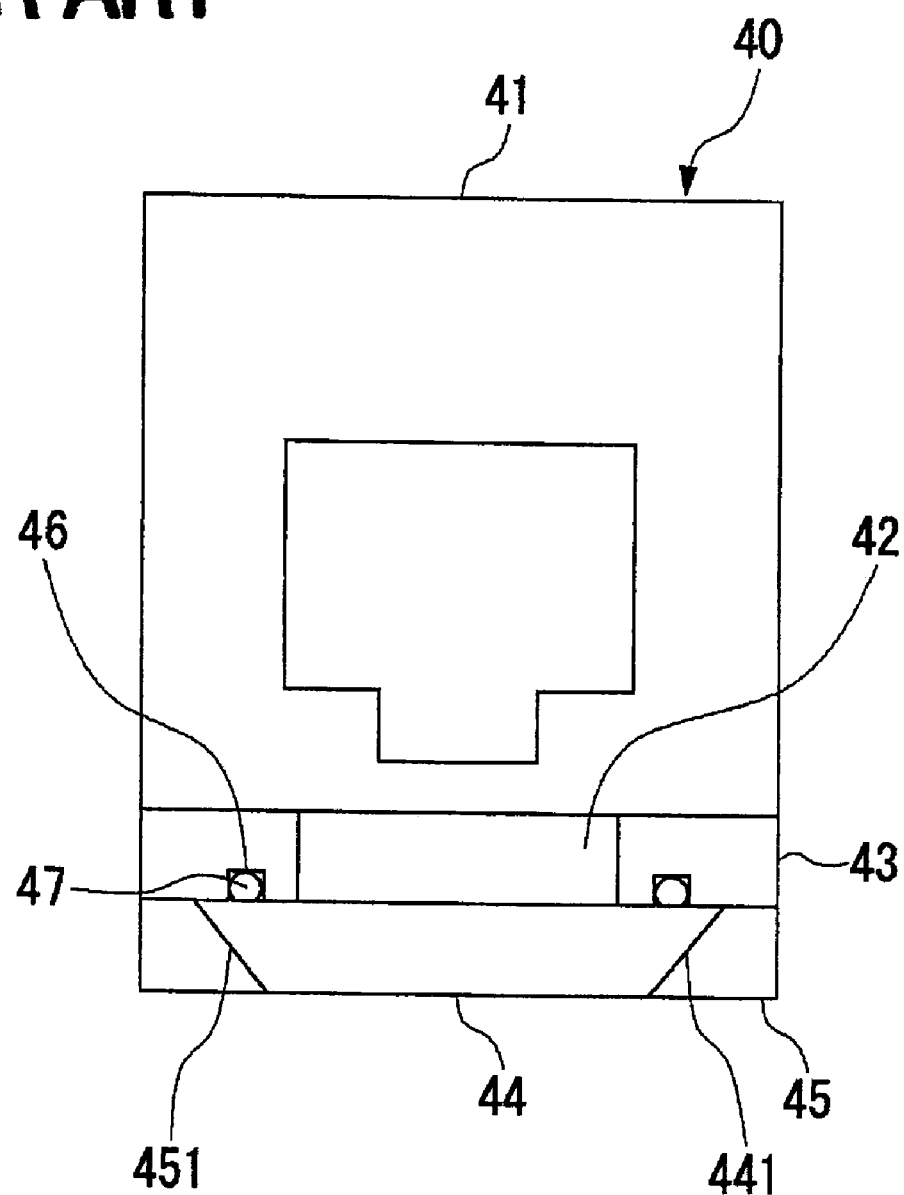
FIG. 10 is a cross-sectional view of the monitor camera in the related art.

FIG. 7 is a cross-sectional view of a principal portion of the monitor camera according to a fifth embodiment of the present invention. In this embodiment, the lens storage cover 12 and the front glass 13 are integrally formed. The lens storage cover 12 is bent inwardly at the end of the side of the object of shooting to form the front wall 24, and is integrated with the front glass 13 with the front wall 24.

In this embodiment, the lens storage cover 12 is formed of resin. At the time of molding, the front glass 13 is arranged so that the front glass 13 comes to the same position with the outer surface of the lens storage cover 12 in the cross direction (i.e. along front-to-rear direction). Therefore, the step is not formed between the outer surface of the front glass 13 and the outer surface of the lens storage cover 12 continuing therefrom. Accordingly, even when the monitor camera 1 is installed in the outdoor, natural substances such as snow is prevented from being accumulated in front of the front glass 13 and hindering the field of view.

Since it is not necessary to hold the front glass 13 from the front side as in the fourth embodiment in this embodiment as well, it is not necessary to provide the shoulder portion on the front glass 13. Therefore, the process of cutting the periphery of the front glass 13 in order to provide the shoulder portion is not required, and hence manufacturing is facilitated.

In this embodiment, the front glass 13 is held by forming the lens storage cover 12 and the front glass 13 integrally with each other, the lens storage cover 12 and the front glass 13 come into tight contact with each other, and hence the waterproof property in the lens storage cover 12 is ensured. Then, even when a tolerance in the direction of the thickness of the front glass 13 exists to some extent, the tolerance appears only as the difference between the front outer surface of the front wall 14 and the outer surface of the front glass 13. Therefore, the shoulder portion of the front wall 24 and the front glass 13 come into tight contact with each other irrespective of the tolerance. Accordingly, the lens storage cover 12 is hermetically sealed reliably, whereby the waterproof property of the lens storage cover 12 is improved.

In the first to fifth embodiments, the lens storage cover 12, the glass hold-down plate 17 or the collar 20 has the outer surface that is positioned at the same position as the outer surface of the front glass 13 at a holding position continuing to the front glass 13. Then, in this arrangement, the step formed by the front glass 13 being stepped back is eliminated and hence even when the monitor camera 1 is installed in the outdoor, natural substances such as snow is prevented from being accumulated in front of the front glass 13 and hindering the field of view. The outer surfaces of the lens storage cover 12, the glass hold-down plate 17 and the collar 20 may substantially or approximately be at the same position as the front glass 13 so as to avoid accumulation of the natural substances such as snow, and within this range, they do not have to be aligned accurately with each other, and the outer surface of the lens storage cover 12 or the collar 20 may be projected from the front surface of the front glass 13. In other words, even when the positions of the both surfaces are not accurately aligned to each other, the positions of the both surfaces only have to be the same within the range of the object of the present invention.

For example, in the second embodiment shown in FIG. 4, the shoulder portion is formed on the side of the outer surface of the front glass 13 and the collar 20 is caulked on the shouldered portion to cover it. However, if the caulked portion is sufficiently thin, the substantial step is not formed, and hindering of the field of view by accumulated natural substances is insignificant. Therefore, the collar 20 may be caulked without providing the shoulder portion in the front glass 13.

The present invention is not limited to the configuration described above, and a configuration in which the outer surfaces of the lens storage cover 12, the glass hold-down plate 17, or the collar 20 are located backwardly of the outer surface of the front glass 13, that is, a configuration in which the outer surface of the front glass 13 projects outward with respect to the outer surface of the lens storage cover 12, the glass hold-down plate 17 or the collar 20 may also be applicable. This configuration can also prevent the natural substances such as snow from being accumulated in front of the front glass 13 and hindering the field of view of the monitor camera.

In addition, in order to fix the front glass 13, in the first and the fifth embodiments, the front glass 13 is held down by the glass hold-down plate 17 or the hold-down plate 21. In the second embodiment, the front glass 13 is fixed by caulking the collar 20. In the third embodiment, the front glass 13 is bonded to the lens storage cover 12 with adhesive agent. However, these fixing methods are compatible. For example, it is also possible to bond the front glass 13 to the collar 20 using adhesive agent instead of fixing the front glass 13 to the collar 20 by caulking.

The front glass 13 in the embodiment described above is formed of glass. However, it is not limited thereto, and may be formed of resin or the like. The front glass 13 may either be transparent or semitransparent, and may be colorless or colored.

The preferred embodiments of the present invention which are considered at this moment have been described thus far. However, it is understood that various modifications may be made in these embodiments, and the attached claims are intended to include all these modifications within the real spirit and scope of the present invention.

INDUSTRIAL APPLICABILITY

As described above, the monitor camera according to the present invention has advantages such that the natural substances such as snow can be prevented from being accumulated on the outer surface of the shooting window member, and the sealing is ensured, and is effective as the monitor camera to be installed in the outdoor or the like.

The invention claimed is:

1. A monitor camera comprising:
a shooting window member;
a hold-down portion having an outer surface which is flush with or stepped back from an outer surface of the shooting window member, the hold-down portion engaging with the shooting window member with a surface perpendicular to the direction of the thickness of the shooting window member; and
a holding portion engaging with the shooting window member and the hold-down portion,
wherein the shooting window member is configured by a first plate-shaped member and a second plate-shaped member having a size smaller than that of the first plate-shaped member being bonded together, and
wherein the shooting window member engages with the hold-down portion at a portion of the first plate-shaped member protruded from the second plate-shaped member.

* * * * *